Sept. 13, 1932.  F. L. LIPCOT  1,876,704
VIBRATION INSULATOR
Filed Jan. 22, 1931   2 Sheets-Sheet 1

INVENTOR.
FRED L. LIPCOT
BY
ATTORNEY

Sept. 13, 1932.  F. L. LIPCOT  1,876,704
VIBRATION INSULATOR
Filed Jan. 22, 1931   2 Sheets-Sheet 2
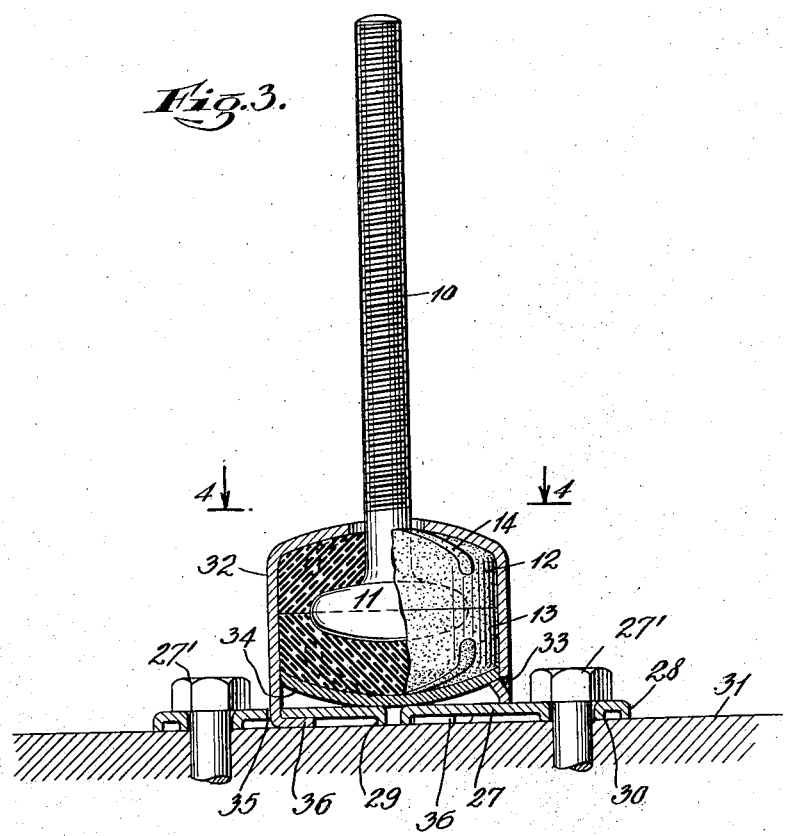
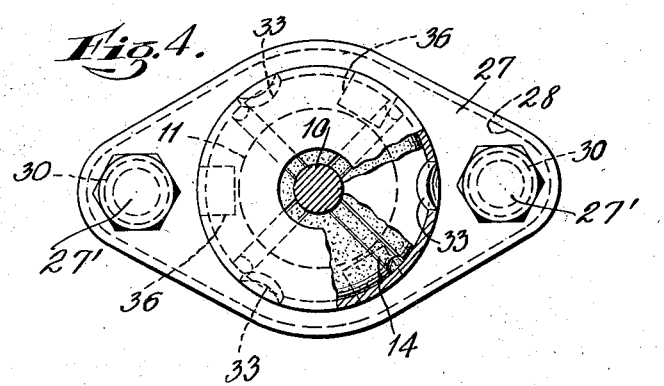
INVENTOR.
FRED L. LIPCOT
BY
ATTORNEY Patented Sept. 13, 1932

1,876,704

UNITED STATES PATENT OFFICE

FRED L. LIPCOT, OF BRIDGEPORT, CONNECTICUT, ASSIGNOR TO RUBBER SHOCK INSULATOR CORPORATION, OF BRIDGEPORT, CONNECTICUT, A CORPORATION OF DELAWARE

VIBRATION INSULATOR

Application filed January 22, 1931. Serial No. 510,343.

The present invention relates to vibration insulators of the type used to provide a non-metallic cushion between two members which will absorb shocks and prevent transmission of vibrations from one member to the other.

More specifically, the invention relates to vibration insulators of the type in which a support for one of the members is embedded in a damping element comprising a block of rubber or like cushioning material, said block being housed in a casing fixed to the other member.

An object of the present invention is to provide an improved form of casing for the damping element.

Another object is to provide a casing which can be readily stamped out of sheet metal, thereby providing a construction that can be manufactured at low expense.

Other objects and advantages of the invention will appear in the following description of two embodiments and thereafter the novelty and scope of the invention will be pointed out in the claims.

In the accompanying drawings;

Fig. 3 is a view similar to Fig. 1, but showing a modified form of casing for the damping element; and Fig. 4 is a view in section taken on the line 4—4 of Fig. 1, with a portion broken away to reveal interior details.

Figure 1:
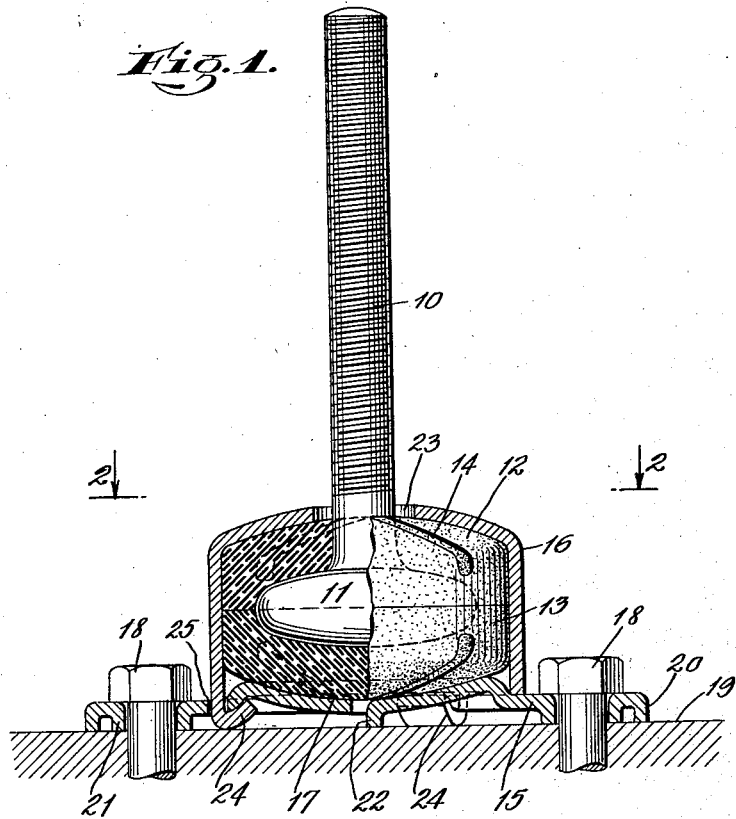
Figure 1 is a view in vertical section of my improved casing with a damping element therein and a support embedded in said element, the latter being shown partly in section.
Figure 2:
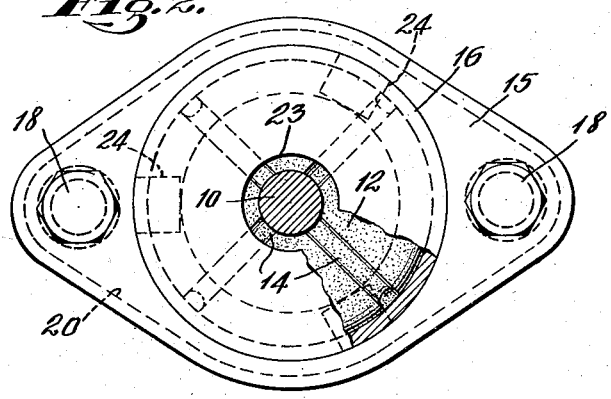
Fig. 2 is a view in section taken on the line 2—2 of Fig. 1, the casing being partly broken away.

In the embodiment shown in Figs. 1 and 2, I employ a foot bolt 10 formed with a broad head 11 of oval form as viewed edgewise and of circular form as viewed endwise of the bolt. This head is embedded in a damping element composed of two disks 12 and 13 of rubber or like cushioning material. The disks are of like form except that the upper disk 12 has an opening therein through which the shank of the foot bolt passes with a snug fit. Each disk is formed with a recess to receive one-half of the depth of the head. The outer face of each disk has a convexity substantially parallel to that of the head. The disks are housed under pressure in a casing closely fitting the same and in order to provide expansion space in which the rubber may flow when the footbolt is subjected to vibrational or other movements, each disk is formed in its outer face with radial slots 14.

The casing in which the disks are housed consists of a base plate 15 and a cylindrical cap 16 secured thereto. The base plate 15 consists of a piece of sheet metal stamped to form a central dished seat 17, conforming substantially to the convexity of the disk 13. The plate extends beyond the seat and is formed on opposite sides thereof with holes to receive bolts 18 by which the casing is attached to a support 19. The margin of the base plate is turned down to form a rim 20 which seats against the support 19, so that the body of the plate 15 is spaced from the support. Surrounding each bolt hole is a down-turned annular flange 21 adapted to provide a firm bearing against the support 19. At the center of the plate 15 a lug 22 is struck downwardly out of the plate to engage the support 19 and provide a central bearing for the base plate.

The cap member 16 is also stamped or otherwise formed of sheet metal and is formed with a domed end wall to fit the convex upper surface of the disk 12. In the center of the domed wall of the cap, there is an aperture 23 of sufficient size to clear the shank of the bolt 10 and allow ample freedom of movement thereof. The cap 16 is formed at its rim with tongues 24 which are adapted to pass through slots 25 in the base-plate 15.

In assembling the insulator the disk 12 is threaded upon the shank 10 and the disk 13 is then placed against the opposite face of the bolt head 11. The shank of the bolt is then passed through the aperture 23 of the cap 16 and the disk 12 is seated therein, after which the plate 15 is fitted against the disk 13 with the tongues 24 of the cap projecting through the slots 25. The parts are so proportioned that when the rim of the cap 16 bears against the body of the plate 15, the disks 12 and 13 will be subjected to the requisite pressure. Thereupon the two parts of the casing are clamped together by bending the tongues 24 inward so as to hook fast to the plate 15.

In practice, the plate 15 is bolted to a suitable support, such as indicated at 19 in Fig. 1. The shank of the bolt 10 may be threaded or otherwise formed for attachment thereto of the member which is to be insulated from the support 19. While I have shown the device as applied to an upwardly extending foot-bolt, it is obvious that it could be inverted or placed at any desired angle as circumstances might require.

In Figs. 3 and 4, I show a modified form of casing for the damping element of the vibration insulator. In this modified construction, a similar foot bolt 10 is employed with its head 11 embedded in disks 12 and 13 of rubber or other suitable cushioning material. The construction of these parts may be the same as those shown in Fig. 1. The casing, however, differs in the fact that the base plate is flat and a separate member is used to support the disk 13. Thus, the base plate 27 consists of a sheet of metal stamped out to approximately the form shown in Fig. 4 and with a down-turned rim 28 along the margin of the plate. At the center of the plate there is a down-turned annular flange 29 struck out of the plate to provide a central support, and near opposite ends of the plate, bolt holes are provided which are also formed with down-turned marginal flanges 30, so that when the plate 27 is secured to a support 31 by means of bolts 27' the body of the plate will be slightly spaced from the support leaving room thereunder for the means by which the cap portion of the housing is secured to the base plate.

The cap 32 is similar in form to the cap 16 except that its cylindrical wall is formed near the bottom with inturned lugs 33 struck out of the metal and providing supports for a dished plate 34. The disks 12 and 13 are clamped between this plate 34 and the domed end wall of the cap 32. In the base plate 27 are formed slots 35 to receive tongues 36 projecting from the rim of the cap 32, and these tongues, after being introduced into the socket 35, are bent at right angles thereto, so as to hook the cap 32 to the base plate 27. The parts are so proportional that when the rim of the cap bears against the surface of the plate 27, the plate 34 will bear firmly against the base plate 27.

An advantage of this construction over that shown in Figs. 1 and 2 lies in the fact that the construction of the base plate is simplified and the dished plate 34 provides a somewhat better support for the disk 13. As shown in Fig. 3 there are no voids between the rubber disks and the casing except such as are provided by the slots 14 in the rubber disks.

Having thus described my invention, what I claim as new and desire to secure by Letters Patent is as follows.

I claim:

1. A sheet metal casing for a damping element of a vibration insulator, comprising a cap formed with tongues, and a base plate adapted to be secured to a support, said plate being formed with slots to receive the tongues and with a marginal bearing rim adapted to space the body of the plate from the support, the plate being also provided with a central lug adapted to bear against the support.

2. A sheet metal casing for a damping element of a vibration insulator, comprising a cap formed with tongues, and a base plate formed with slots to receive the tongues and with holes for bolts whereby the plate may be attached to a support, the margins of the plate and of said holes being formed with bearing rims adapted to space the body of the plate from the support, the plate being also formed with a central lug adapted to bear against the support.

3. In a vibration insulator, the combination with a damping element formed with opposed convex surfaces, of a sheet metal casing therefor, comprising a cap having a domed end wall forming a seat for one of said surfaces, and a base plate formed with a dished seat for the other of said surfaces, said plate being formed with slots and said cap being formed with tongues adapted to be passed through the slots and bent into clamping engagement with the base plate, said base plate being also formed with a marginal rim adapted to bear against a support.

4. A sheet metal casing for a damping element of the character described, said casing comprising a cap formed with tongues at the rim thereof and with a domed end wall, a base plate formed with slots to receive the tongues, and a dished disk in the cap and bearing at its center on the plate, the cap being formed with means supporting the rim of the disk.

5. A sheet metal casing for a damping element of the character described, said casing comprising a cap formed with tongues at the rim thereof and with a domed end wall, a base plate formed with slots to receive the tongues, and a dished disk in the cap and bearing at its center on the plate, the cap being formed with in-turned lugs supporting the rim of the disk, and the plate being formed with bearing flanges adapted to space the body of the plate from a support.

6. A sheet metal casing for a damping element of the character described, said casing comprising a cap formed with tongues at the rim thereof and with a domed end wall, a base plate formed with slots to receive the tongues, and a dished disk in the cap and bearing at its center on the plate, the cap being formed with in-turned lugs supporting the rim of the disk, the plate being formed with marginal bearing flanges and with a central bearing lug adapted to space the body of the plate from a support.

7. A sheet metal casing for a damping element of the character described, said casing comprising a cap formed with tongues at the rim thereof and with a domed end wall, a base plate formed with slots to receive the tongues and with holes for bolts whereby the casing may be attached to a support, a dished disk in the cap and bearing at its center on the plate, the cap being formed with in-turned lugs supporting the rim of the disk, the plate being also formed at its margin and about said holes with bearing rims adapted to space the body of the plate from the support, and the plate being further formed with a central lug adapted to bear against the support.

8. In a vibration insulator, the combination with a damping element formed with opposed convex surfaces, of a sheet metal casing therefor, comprising a cap having a domed end wall forming a seat for one of said surfaces and a base plate formed with a dished seat for the other of said surfaces, said plate being formed with slots and said cap being formed with tongues adapted to be passed through the slots and bent into clamping engagement with the base plate, said base plate being formed with a marginal rim and with a central lug struck out of the plate, the rim and the lug being adapted to bear against a support.

In testimony whereof, I have signed this specification.

FRED L. LIPCOT.